Alonzo B Baty's
Improved Spring Bed Bottom

71840

PATENTED
DEC 10 1867

Witnesses
F. A. Dunker
P. W. Hopkins

Alonzo B. Baty

United States Patent Office.

ALONZO B. BATY, OF BINGHAMTON, NEW YORK.

Letters Patent No. 71,840, dated December 10, 1867.

---

IMPROVED SPRING-BED BOTTOM.

---

*The Schedule referred to in these Letters Patent and making part of the same.*

---

TO ALL WHOM IT MAY CONCERN:

Be it known that I, ALONZO B. BATY, of Binghamton, in the county of Broome, and State of New York, have invented a new and useful Improvement on Spring-Bed Bottoms; and I do hereby declare that the following is a full, clear, and exact description of the construction and operation of the same, reference being had to the annexed drawings, making a part of this specification, in which—

Like letters indicate corresponding parts in each figure.

Figures 1, 2:
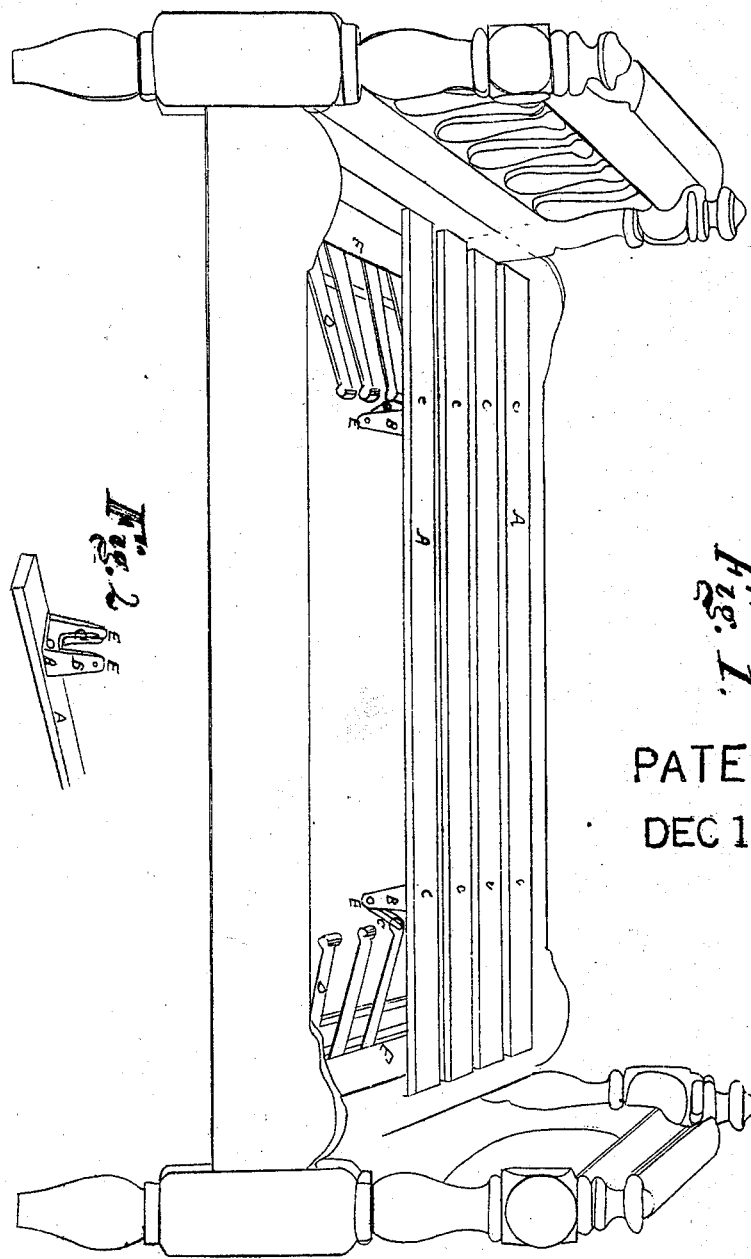
Figure 1 is a perspective view of the bedstead and spring-bottom attached, with two of the slats removed to show the arrangement.
Figure 2 is one of the slats inverted, representing the bracket and bail or pendant.

The nature of my invention consists in the construction of a series of flat steel springs, one end of which is bent to correspond with and be attached to a half round transverse piece near each end of the bedstead, and the other is bent for a bearing to hold the bail or pendant of a bracket, which is attached to the under side, and near each end of a set of longitudinal slats for the bed to rest upon, thereby obviating the difficulties experienced in the adjustment of those in ordinary use, and insuring a more uniform operation of the springs, and a more ready adaptability of the slats to the varying pressure to which they are subjected.

I construct my spring-bed bottoms in any of the known forms, placing the slats A A either in a longitudinal or transverse direction, but prefer the former. Near the ends and on the under side of the slats I attach brackets B B, with two projections, between which is suspended an inverted bail or pendant, C, which works on the free end of the springs D D. The ends of said bail are bent at right angles, and work as pivots in holes at the end of the projections E E. This bail is made of wire, bent to the proper shape, and sprung into its proper place. Near each end, on the inside of the bedstead, I place a transverse piece, F, with its ends resting in bearings attached to the sides. These cross-pieces are rounded on the upper side, and the ends of the springs, which are to be attached to said rounded part, are bent to correspond with them, being secured in their places by screws, thereby insuring a more natural and easy action. The free end of said springs is bent to hold the bail or pendant C, which forms the connection with the bracket B and the slat A. For the purpose of preventing the slats from swaying endwise, I place the end of the spring that holds the bail or pendant out from a perpendicular line with the eyes or holes in the brackets, as represented in fig. 1, letters C C. I make the springs of steel or other suitable metallic substance, and cut and swage them to the proper form. The brackets are made of cast iron, and firmly attached to the slats far enough from the ends for the springs to work outside of them. The transverse pieces F F being placed under the springs, prevent them from injury by undue pressure on the bed; for when the springs are sprung to a given point they are relieved by the contact of said cross-pieces with the ends of the slats. The arrangement of the bail or pendant, in connection with the spring, is such that when in use the slats readily adjust themselves to the changing pressure on the bed, and can be easily removed and replaced.

I am aware that there are many arrangements for similar purposes, some using flat steel springs at the ends of slats, others using rubber springs in various ways. The form and operation of my springs, in connection with the bracket B and bail or pendant C, and the situation of the cross-pieces F F, are dissimilar to any in use. I therefore disclaim all interference with those of a similar character, and confine myself only to the novel features of my improvement.

Having thus described my invention, what I claim, and desire to secure by Letters Patent, is—

The construction and application of the bracket B, in combination with the bail or pendant C, the springs D D, transverse pieces F F, and slats A A, all being constructed substantially as herein described and represented, for the purpose set forth.

ALONZO B. BATY.

Witnesses:
F. A. DURKEE,
P. W. HOPKINS.